A. C. CULVER.
DRIVING MECHANISM.
APPLICATION FILED JULY 10, 1916.

1,285,631.

Patented Nov. 26, 1918.
2 SHEETS—SHEET 1.

Inventor
Arthur C. Culver,
By Pagelsen and Spencer
Attorneys.

Witness
L. W. Patee

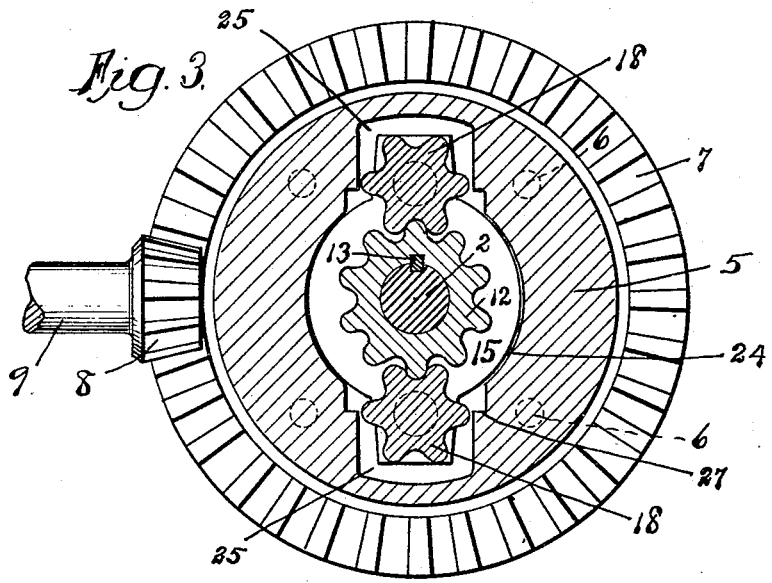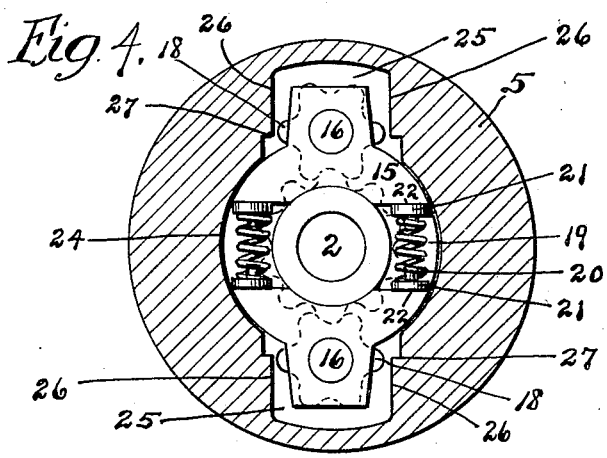

UNITED STATES PATENT OFFICE.

ARTHUR C. CULVER, OF DETROIT, MICHIGAN.

DRIVING MECHANISM.

1,285,631.  Specification of Letters Patent.  Patented Nov. 26, 1918.

Application filed July 10, 1916. Serial No. 108,286.

*To all whom it may concern:*

Be it known that I, ARTHUR C. CULVER, a citizen of the United States, and residing at Detroit, in the county of Wayne and State of Michigan, have invented a new and Improved Driving Mechanism, of which the following is a specification.

This invention relates to means for driving two disconnected but alined shafts or axles, and its object is to permit either of these shafts or axles to rotate at a greater speed than the driving element while at the same time causing the other shaft or axle to rotate at the speed of the driving element.

This invention consists in a casing and means to rotate it, a pair of alined shafts extending into the casing and having gears secured to their adjacent ends, a pinion support rotatably mounted on each shaft and carrying a pinion meshing with the gear on the shaft, and springs in engagement with the supports and so tensioned that the supports and the pinions carried thereby will alaways tend to remain in the same position relative to each other, the casing being cut out to receive these gears, pinions and supports and permit a slight movement of the supports about the shafts, sufficiently so that the pinions can rotate upon their axles, the pinions normally engaging the casing and being prevented from turning thereby.

Figure 1:
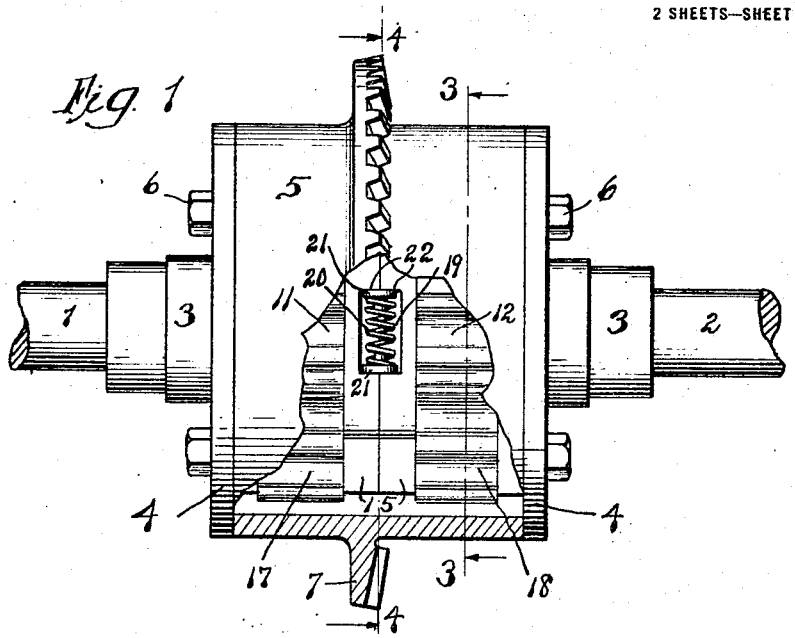
Figure 2:
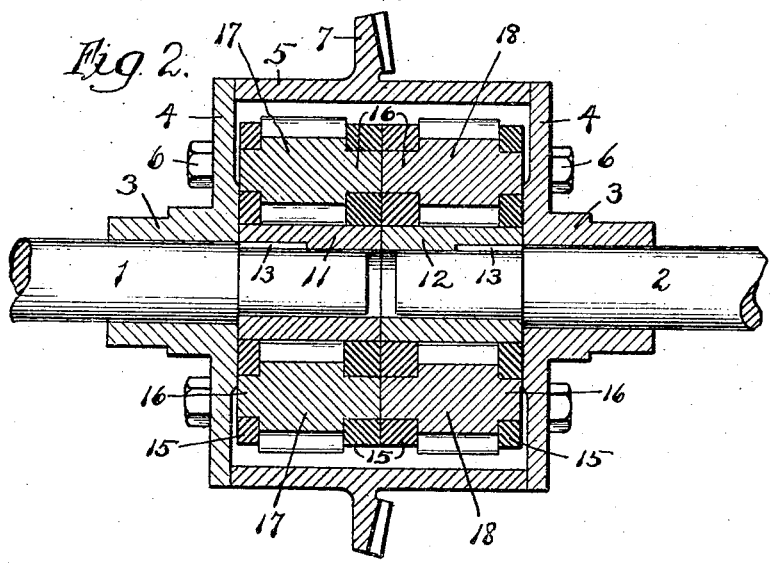

In the accompanying drawings, Figure 1 is an elevation of this improved device with a portion of the casing broken away to show the interior mechanism. Fig. 2 is a central section parallel to the plane of Fig. 1. Fig. 3 is a section on the line 3—3 of Fig. 1. Fig. 4 is a section on the line 4—4 of Fig. 1.

The alined driven shafts or axles 1 and 2 are rotatably mounted in the hubs 3 on the end plates 4 secured to the body 5 of the casing by means of the screws 6. The casing may be rotated in any desired manner and thereby become the driving member, a ring 7 of teeth being shown meshing with the pinion 8 on the shaft 9. A gear 11 is secured to the shaft 1 and a gear 12 to the shaft 2 by means of keys 13.

Rotatably mounted on the hubs of these gears are the pairs of plates 15, each of which is formed with a bearing for the cylindrical axle 16 on one of the pinions 17 and 18, which pinions are preferably arranged in pairs, the pinions of each pair being preferably on directly opposite sides of the alined shafts. The number of pinions may however, be varied as desired. These pairs of plates constitute supports for the pinions and are freely rotatable on the shafts. The plates 15 may together be considered a cage.

The two central plates 15 are formed with notches 19 in which are mounted the springs 20, the ends of the springs being provided with feet 21 that normally rest or bear against the end walls 22 of the notches of both of the central plates. The result is that these springs will normally hold the plates 15 and pinions in alinement but will permit a limited angular movement between these plates.

The body 5 of the case has a cylindrical cavity or chamber 24 to receive the gears 11 and 12 and the central portions of the plates 15, and extensions or auxiliary chambers 25 for the ends of these supports and the pinions 17 and 18. These extensions 25 are sufficiently wide to permit the pinions 17 and 18 to rotate freely when these pinions are centrally positioned. The ends of the teeth of the pinions are preferably rounded.

The operation of this device is as follows: When the casing is rotated, the walls 26 of the extensions 25 of the chamber 24 engage the pinions 17 and 18 and prevent them from turning and at the same time cause these pinions to carry the gears 11 and 12 around with them. This is rendered peculiarly effective by the grooves 27 wherein the teeth of the pinions engage. Both shafts will now rotate at the same speed with the driving member or casing. When this construction is used to drive an automobile and the shafts 1 and 2 are the two half axles of the vehicle, it often happens that one axle must turn at a higher speed than the other, as when the vehicle is turning a corner. In such case, the outside wheel of the vehicle and its axle will turn faster than the driving casing.

This tendency of one shaft or axle, say the axle 2, to turn faster than the casing is resisted by the springs 20 which tend to hold the axles of pinions 18 in alinement with the pinions 17, but the force of these springs is not sufficient to prevent these pinions 18 being swung out away from the driving wall 26. When this occurs, the pinions 18 can rotate freely and the "outer" wheel on the shaft 2 over-run the "inner" wheel on the shaft 1. It will therefore be clear that the shafts 1 and 2 must turn at at least the speed of the gear ring 7, but that either shaft may turn faster than this gear ring, but in the same direction.

I claim:—

1. In a driving mechanism, the combination of two alined shafts and toothed gears on the adjacent ends of the shafts, a casing in which the adjacent ends of the shafts are rotatable and means to rotate the casing, toothed pinions engaging said gears and freely rotatable means mounted on the shafts to rotatably support each of the pinions independently of the other, said casing having a central chamber to receive said gears and the chamber having narrower extensions to receive the pinions and of sufficient width to permit the pinions to rotate freely within the extensions, the side walls of said chamber extensions being adapted to engage the teeth of the pinions and prevent them from rotating and at the same time rotate said shafts.

2. In a driving mechanism, the combination of a pair of alined toothed gears, a casing in which the gears are rotatable, pinion supporting means rotatably mounted relative to each gear, and a toothed actuating pinion rotatably supported by each supporting means in positive engagement with the adjacent gear, said casing being chambered to permit free rotation of the pinions and gears and also having portions to engage the teeth of the pinions to prevent the pinions and gears from turning relative to the casing.

3. In a driving mechanism, the combination of alined shafts, gears mounted on the shafts and rotatable therewith, a casing in which the shafts are rotatable and means to rotate the casing, a pair of plates rotatably mounted on each shaft, one at each side of the gear thereon, and a pinion rotatably supported by each pair of plates in engagement with the gear between them, said casing being chambered to permit the free rotation of said gears and pinions and also having portions to engage the pinions to cause the same to turn the shafts with the case.

4. In a driving mechanism, the combination of alined shafts, gears mounted on the shafts and rotatable therewith, a casing in which the shafts are rotatable and means to rotate the casing, a pair of plates rotatably mounted on each shaft, one at each side of the gear thereon, a pinion rotatably supported by each pair of plates in engagement with the gear between them, said case being chambered to permit the free rotation of said gears and pinions and also having portions to engage the pinions to cause the same to turn the shafts with the case, and means to normally hold said pairs of plates in definite relation to each other.

5. In a driving mechanism, the combination of alined shafts, gears mounted on the shafts and rotatable therewith, a casing in which the shafts are rotatable and means to rotate the casing, a pair of plates rotatably mounted on each shaft, one at each side of the gear thereon, a pinion rotatably supported by each pair of plates in engagement with the gear between them, said case being chambered to permit the free rotation of said gears and pinions and also having portions to engage the pinions to cause the same to turn the shafts with the case, and a spring in engagement with the adjacent plates on the two shafts to hold the pinions in definite relation to each other.

6. In a driving mechanism, the combination of alined shafts, gears mounted on the shafts and rotatable therewith, a casing in which the shafts are rotatable and means to rotate the casing, a pair of plates rotatably mounted on each shaft, one at each side of the gear thereon, a pinion rotatably supported by each pair of plates in engagement with the gear between them, said case being chambered to permit the free rotation of said gears and pinions and also having portions to engage the pinions to cause the same to turn the shafts with the case, the plates at the ends of said shafts having transverse grooves in their adjacent faces, and a coil spring mounted in said notches and engaging both of said plates with each end to normally hold said plates in definite relation to each other.

ARTHUR C. CULVER.

Copies of this patent may be obtained for five cents each, by addressing the "Commissioner of Patents. Washington, D. C."